US007913484B2

(12) United States Patent
Roychoudhury et al.

(10) Patent No.: US 7,913,484 B2
(45) Date of Patent: Mar. 29, 2011

(54) CATALYTIC BURNER APPARATUS FOR STIRLING ENGINE

(75) Inventors: Subir Roychoudhury, Madison, CT (US); David L. Spence, Beacon Falls, CT (US); Bruce Crowder, New Haven, CT (US); Jonathan Berry, Simsonville, SC (US); Richard Mastanduno, Milford, CT (US)

(73) Assignee: Precision Combustion, Inc., North Haven, CT (US)

( * ) Notice: Subject to any disclaimer, the term of this patent is extended or adjusted under 35 U.S.C. 154(b) by 988 days.

(21) Appl. No.: 11/803,464

(22) Filed: May 14, 2007

(65) Prior Publication Data

US 2008/0078175 A1 Apr. 3, 2008

Related U.S. Application Data

(63) Continuation-in-part of application No. 11/364,402, filed on Feb. 28, 2006, now abandoned.

(60) Provisional application No. 60/799,857, filed on May 13, 2006.

(51) Int. Cl.
*F02C 5/00* (2006.01)

(52) U.S. Cl. .......................................... 60/39.6; 60/517

(58) Field of Classification Search .................. 60/39.6, 60/517–526

See application file for complete search history.

(56) References Cited

U.S. PATENT DOCUMENTS

| | | | | |
|---|---|---|---|---|
| 4,255,121 | A | 3/1981 | Sugimoto | |
| 4,702,903 | A | 10/1987 | Keefer | 423/359 |
| 4,965,052 | A * | 10/1990 | Lowther et al. | 422/187 |
| 5,051,241 | A | 9/1991 | Pfefferle | |
| 5,590,526 | A | 1/1997 | Cho | 60/517 |
| 5,725,151 | A | 3/1998 | Hetrick | |
| 5,918,463 | A * | 7/1999 | Penswick et al. | 60/517 |
| 6,183,241 | B1 | 2/2001 | Bohn et al. | 431/326 |
| 6,282,895 | B1 | 9/2001 | Johansson et al. | 60/524 |
| 6,491,236 | B1 | 12/2002 | Keller | |
| 6,513,326 | B1 | 2/2003 | Maceda et al. | 60/517 |
| 6,746,657 | B2 * | 6/2004 | Castaldi | 423/437.2 |
| 6,755,021 | B2 | 6/2004 | Johansson | 60/517 |
| 6,767,518 | B2 | 7/2004 | Ichikawa | |
| 6,775,982 | B1 | 8/2004 | Kitamura et al. | 60/641.8 |
| 6,857,260 | B2 * | 2/2005 | Langenfeld et al. | 60/39.6 |
| 6,877,315 | B2 | 4/2005 | Clark et al. | 60/517 |
| 6,931,848 | B2 | 8/2005 | Maceda et al. | 60/524 |

(Continued)

FOREIGN PATENT DOCUMENTS

WO WO 2008048353 A2 4/2008

OTHER PUBLICATIONS

Co-pending U.S. Appl. No. 12/587,593, filed Oct. 8, 2009, in the names of Subir Roychoudhury, et al.; unpublished.

(Continued)

*Primary Examiner* — Hoang M Nguyen
(74) *Attorney, Agent, or Firm* — Robert L. Rispoli

(57) ABSTRACT

The invention provides a method for transferring heat by conduction to the internal heat acceptor of an external combustion engine. Fuel and air are introduced and mixed to form an air/fuel mixture. The air/fuel mixture is directed into a catalytic reactor that is positioned substantially adjacent to the heater head. Heat is transferred via conduction from the catalytic reactor to the heater head and the catalytic reaction products are exhausted.

6 Claims, 9 Drawing Sheets

U.S. PATENT DOCUMENTS

| | | | | |
|---|---|---|---|---|
| 6,971,235 | B2 * | 12/2005 | Langenfeld et al. | 60/517 |
| 2004/0209105 | A1 * | 10/2004 | Wittebrood | 428/548 |
| 2004/0209205 | A1 | 10/2004 | Gomez et al. | 431/2 |
| 2005/0028445 | A1 | 2/2005 | Roychoudhury | |
| 2007/0151154 | A1 | 7/2007 | Lyubovsky | |
| 2008/0127553 | A1 | 6/2008 | Roychoudhury | |
| 2009/0113889 | A1 | 5/2009 | Roychoudhury | |

OTHER PUBLICATIONS

Co-pending U.S. Appl. No. 12/655,703, filed Jan. 6, 2010, in the names of Subir Roychoudhury, et al.; unpublished.

Co-pending U.S. Appl. No. 12/655,702, filed Jan. 6, 2010, in the names of Subir Roychoudhury, et al.; unpublished.

* cited by examiner

SECTION A-A

CATALYTIC BURNER APPARATUS FOR STIRLING ENGINE

CROSS-REFERENCE TO RELATED APPLICATIONS

This application claims the benefit of U.S. Provisional Application No. 60/799,857 filed May 13, 2006. This application also is a continuation-in-part of U.S. patent application Ser. No. 11/364,402; filed Feb. 28, 2006 now abandoned, incorporated herein by reference.

GOVERNMENT RIGHTS

This invention was made with government support under U.S. Contract No. W911-NF-04-1-0238, Subaward No. Y-04-0023. The U.S. government holds certain rights in this invention.

FIELD OF THE INVENTION

The present invention is generally directed to an apparatus for providing heat to an external combustion engine. In particular, the present invention is directed toward providing substantially conductive heat transfer to the internal heat acceptor, commonly referred to the heater head, of a Stirling Engine. More particularly, the present invention comprises a burner containing a recuperator, fuel injector, mixer (via swirler), heat transfer arrangement and igniter for catalyst ignition (via resistive heating).

BACKGROUND OF THE INVENTION

As is well known in the art, Stirling Engines convert a temperature difference directly into movement. Such movement, in turn, may be converted into mechanical or electrical energy. The Stirling Engine cycle comprises the repeated heating and cooling of a sealed amount of working gas. When the gas in the sealed chamber is heated, the pressure increases and acts on a piston thereby generating a power stroke. When the gas in the sealed chamber is cooled, the pressure decreases and is acted upon by the piston thereby generating a return stroke.

Stirling Engines, however, require an external heat source to operate. The heat source may be the result of combustion and may also be solar or nuclear. In practicality, the rate of heat transfer to the working fluid within the Stirling Engine is one primary mechanism for increasing the power output of the Stirling Engine. One skilled in the art, however, will recognize that power output may be increased through a more efficient cooling process as well.

U.S. Pat. No. 5,590,526 to Cho describes a conventional prior art burner for a Stirling Engine. Generally, a combustion chamber provides an air-fuel mixture for the burner by mixing air and fuel supplied from air inlet passageways and a fuel injection nozzle, respectively. An igniter produces a flame by igniting the air-fuel mixture formed within the combustion chamber. A heater tube absorbs high temperature heat generated by the combustion of the air-fuel mixture and transfers the heat to the Stirling Engine working fluid. Exhaust gas passageways discharge an exhaust gas.

A more efficient heat source is described in U.S. Pat. No. 5,918,463 to Penswick, et al. (hereinafter referred to as "Penswick") in order to overcome the problem of delivering heat at non-uniform temperatures. As described by Penswick, Stirling engines require the delivery of concentrated thermal energy at uniform temperature to the engine working fluid.

(See Penswick Column 1, lines 39-40). In the approach disclosed by Penswick, a burner assembly transfers heat to a Stirling Engine heater head primarily by radiation and secondarily by convection. (See Penswick Column 1, lines 58-61). Penswick discloses the device with respect to an external combustion engine, a Stirling Engine, and a Stirling Engine power generator. (See Penswick Column 2, lines 36-66).

With respect to the external combustion engine, the Penswick burner assembly includes a housing having a cavity sized to receive a heater head and a matrix burner element carried by the housing and configured to transfer heat to the heater head. (See Penswick Column 2, lines 38-41). With respect to the Stirling Engine, the Penswick burner assembly includes a housing having a cavity sized to receive a heater head and a matrix burner element configured to encircle the heater head in spaced apart relation. (See Penswick Column 2, lines 48-51). Lastly, with respect to the Stirling Engine power generator, the Penswick burner assembly includes a housing having a cavity sized to receive the heater head and a matrix burner element configured to encircle the heater head in spaced apart relation. (See Penswick Column 2, lines 63-66).

The Penswick burner housing supports a fiber matrix burner element in radially spaced apart, but close proximity to, a radially outer surface of the Stirling Engine heater head. (See Penswick Column 4, lines 19-21). Penswick further discloses that combustion may occur in radiant or blue flame. In the radiant mode, combustion occurs inside matrix burner element which, in turn, releases a major portion of the energy as thermal radiation. In the blue flame mode, blue flames hover above the surface and release the major part of the energy in a convective manner. (See Penswick Column 4, lines 42-54). Hence, operation of the Penswick burner requires space between the combusting matrix element and the heater head in order to operate in any of the modes disclosed by Penswick.

Moreover, Penswick describes a heat chamber that is formed within the burner housing between the inner surface of the matrix burner element and the outer surface of the Stirling Engine heater head. Heat transfer occurs within the heat chamber primarily through radiation from the matrix burner element to the Stirling Engine heater head, and secondarily via the passing of hot exhaust gases over the Stirling Engine heater head. (See Penswick Column 6, lines 1-7, and FIG. 5). According to Penswick, heat being delivered through the heat chamber and over the Stirling Engine heater head is conserved as a result of insulation. (See Penswick Column 7, lines 17-20). However, a problem still exists in the art with respect to enhancing the efficiency of the operation of a Stirling Engine.

As recognized by one skilled in the art, the uniform burning of a matrix burner element remains a problem. In U.S. Pat. No. 6,183,241 to Bohn, et al. (hereinafter referred to as "Bohn"), computer simulation was employed to develop an inward-burning, radial matrix gas burner to attempt to solve the difficulty of obtaining uniform flow and uniform distribution in a burner matrix. (See Bohn, Abstract and Column 1, lines 54-56). According to Bohn, metal matrix burners have received much attention because of their ability to burn fossil fuels with very low emissions of nitrogen oxides. (See Bohn, Column 1, lines 37-39). With respect to the transfer of heat to the Stirling Engine heater head, Bohn also teaches that a significant fraction of the heat of combustion is released as infrared radiation from the matrix. (See Bohn, Column 1, lines 42-44).

Bohn's solution provides a high-temperature uniform heat via a cylinder-shaped radial burner, a curved plenum, porous mesh, divider vanes, and multiple inlet ports. Extended upstream fuel/air mixing point provide for uniform distribution of a preheated fuel/air mixture. (See Bohn, Column 4, lines 56-61). Bohn teaches the use of a space formed between a heat pipe and the burner matrix and the use of a mesh screen therebetween to promote uniform radiant heat transfer. Unfortunately, the solution offered by Bohn still is too complex and inefficient for desired uses.

Yet another method for transferring heat to the heater head of a Stirling Engine is disclosed in U.S. Pat. No. 6,877,315 to Clark, et al. (hereinafter referred to as "Clark"). According to Clark, the Stirling Engine heater head is generally arranged vertically with a burner surrounding it to supply heat so that hot exhaust gases from the burner can escape upwards. The device disclosed by Clark enhances the transfer of heat to the Stirling Engine heater head to increase its efficiency by employing fins to increase the heater head surface area. (See Clark, Column 1, lines 19-33). Clark teaches that a problem still exists in the art with respect to the effective and efficient transfer of heat to a Stirling Engine heater head as late as 2003.

In the device disclosed by Clark, an annular burner surrounds the heat transfer head and provides the heat source. The heat transfer head is provided with a plurality of fins to promote and enhance heat transfer. (See Clark, FIG. 1 and Column 2, lines 34-45). Radiant heat is transferred to the heater head and also to other substantially parallel fins to further enhance the heat transfer. (See Clark, Column 1, lines 63-65). As with the other prior art cited, the relative spaced-apart relationship that allows heat to be transferred radiantly is important. Clark teaches that the source of radiant heat is arranged opposite to the plurality of fins such that radiant heat is directed into the spaces between adjacent fins. (See Clark, Column 3, lines 4-6).

Another problem with burner devices for a Stirling Engine is described in U.S. Pat. No. 6,513,326 to Maceda, et al. (hereinafter referred to as "Maceda"). Maceda discloses a conventional burner device in which air and fuel are injected into the burner and then ignited to cause heat to be generated. The working gas is carried within a plurality of heater tubes that are positioned proximate to the burner device so that heat is transferred from the burner device to the working gas flowing within the heater tubes. (See Maceda, Column 1, lines 39-46). As known to one skilled in the art, the heater tubes are positioned proximate to the burner device such that heat can be radiantly transferred from the burner device to the tubes.

According to Maceda, heat is not uniformly distributed to the working gas within the heater tubes because a single burner device is used to generate and effectuate the heat transfer. (See Maceda, Column 1, lines 55-59). As a solution to the problem of uniform heat distribution, Maceda teaches the use of a heat exchange manifold employing multiple platelets that are stacked and joined together. (See Maceda, Column 2, lines 22-24). Instead of having one large burner device with one combustion chamber and a multiple of heater tubes per piston cylinder, the Maceda manifold provides a substantially greater number of individual combustion chambers. (See Maceda, Column 2, lines 51-57). Unfortunately, the solution offered by Bohn still is too complex and inefficient for desired uses.

Based on the foregoing, what is need is a simple, efficient and effective method and apparatus for generating and transferring heat to the heater head of a Stirling Engine. A method for generating and transferring heat to the heater head of a Stirling Engine is currently being prosecuted under Applicants' U.S. patent application Ser. No. 11/364,402. An apparatus for generating and transferring heat to the heater head of a Stirling Engine is described and claimed hereinbelow.

SUMMARY OF THE INVENTION

The present invention provides a simple, efficient and effective apparatus for generating and transferring heat to the heater head of a Stirling Engine. It has now been found that a catalytic reactor comprising catalyst deposited on ultra-short-channel-length metal mesh elements, known as Microlith™ and commercially available from Precision Combustion, Inc., located in North Haven, Conn., efficiently and effectively generates heat as a burner within the operative constraints for a Stirling Engine known within the art. More importantly and in contrast to the prior art, the catalytic reactor comprising catalyst deposited on Microlith™ ultra-short-channel-length metal mesh elements may be positioned in direct (i.e., non spaced-apart) communication with the heater head thereby providing heat transfer by thermal conduction, the most efficient manner of heat transfer in Stirling Engine applications.

Microlith® ultra-short-channel-length metal mesh technology is a novel reactor engineering design concept comprising of a series of ultra-short-channel-length, low thermal mass metal monoliths that replaces the long channels of a conventional monolith. Microlith® ultra-short-channel-length metal mesh design promotes the packing of more active area into a small volume, providing increased reactivity area for a given pressure drop. Whereas in a conventional honeycomb monolith, a fully developed boundary layer is present over a considerable length of the device, the ultra short channel length characteristic of the Microlith® substrate avoids boundary layer buildup. Since heat and mass transfer coefficients depend on the boundary layer thickness, avoiding boundary layer buildup enhances transport properties. The advantages of employing Microlith® ultra-short-channel-length metal mesh as a substrate to control and limit the development of a boundary layer of a fluid passing therethrough is described in U.S. patent application Ser. No. 10/832,055 which is a Continuation-In-Part of U.S. Pat. No. 6,746,657 to Castaldi, both incorporated in their entirety herein.

In one embodiment of the present invention, a catalytic reactor comprises a catalytically reactive Microlith® ultra-short-channel-length metal mesh positioned in close proximity to (i.e., not spaced-apart from or in physical connection with) thermally conductive walls. Use of the catalytically reactive Microlith® ultra-short-channel-length metal mesh in this manner provides for: rapid catalytic light-off; excellent robustness for different fueling rates; and easy replacement of the catalytic reactor burner section of the Stirling Engine. The thermally conductive walls of the catalytic reactor minimize the potential for the overheating of the catalyst even at equivalence ratios near 1.0. Energy, in the form of heat, is rapidly extracted from the catalytic fuel oxidation zone.

Any conventional air supply, fuel supply, and air/fuel mixing technique may be employed to provide these feeds to a device according to the present invention. Any conventional mounting technique may be employed to mount a device according to the present invention within thermal conductivity to the heater head of the Stirling Engine.

In one embodiment, the computer 522 calculates ERIC according to the following:

$$ERIC=(k/k_{ink})*10^6\ \text{(ppm)}$$

In the above equation, k is the specific absorption coefficient of the piece of recycled paper being tested, where k is $$k = \frac{(1-R)^2 - T^2}{w \cdot \sqrt{(1-T^2+R^2)^2 - 4R^2}} \sinh^{-1}\left[\frac{1}{2T}\sqrt{(1-T^2+R^2)^2 - 4R^2}\right]$$

R =R(w) =(J(w)/I(w)),
T =T(0) =(I(0)/I(w)),
and $k_{ink}$ is the specific absorption coefficient of ink. As noted in the above equations, and as explained in more detail in the appendix, w is the grammage of the paper being tested. I(w) is a light flux of the incident beam on the front surface of the paper being tested, as measured by a photosensor 214R or 514R during calibration of the photosensor. J(w) is a light flux of the reflected beam at the front surface of the paper being tested, as measured by a photosensor 214R or 514R after calibration of the photosensor. I(0) is a light flux of the transmitted beam after passing through the paper being tested, as measured by a photosensor 214T or 514T after calibration of the photosensor.

In addition, as noted in the Appendix, the scattering coefficient s may be determined as follows:

$$k = \frac{(1-R)^2 - T^2}{w \cdot \sqrt{(1-T^2+R^2)^2 - 4R^2}} \sinh^{-1}\left[\frac{1}{2T}\sqrt{(1-T^2+R^2)^2 - 4R^2}\right].$$

In another embodiment of the present invention, the catalytic burner employs an electrohydrodynamic liquid fuel dispersion system, generally referred to as an electrosprayer, as described in significant detail in U.S. patent application Ser. No. 10/401,226 of in the names of Gomez and Roychoudhury; filed on Mar. 27, 2003, and claiming priority to U.S. Provisional Patent Application No. 60/368,120.

In another embodiment of the present invention, the Stirling Engine burner apparatus comprises a recuperator, fuel injector, mixer (via swirler), heat transfer arrangement and igniter for catalyst ignition (via resistive heating).

BRIEF DESCRIPTION OF THE DRAWINGS

FIG. 10 provides an efficiency flow chart representing the operation of an embodiment of the present invention.

DETAILED DESCRIPTION OF THE INVENTION

Figure 1:
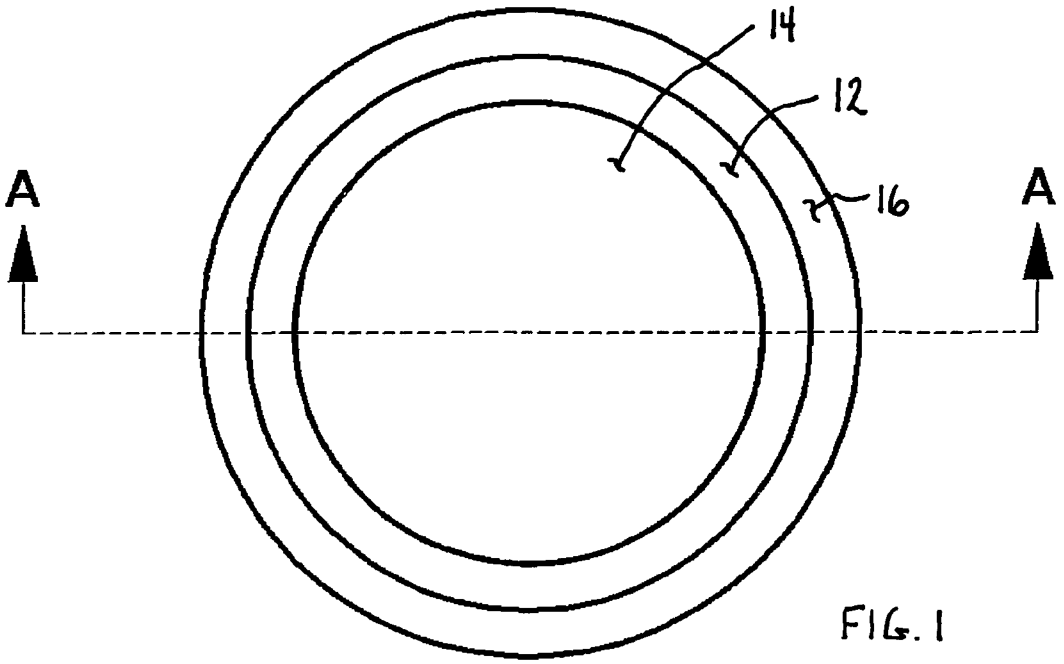
FIG. 1 provides a top view of a Stirling Engine heater head surrounded by a catalyst bed and catalyst holder in accordance with the present invention.
Figure 2:
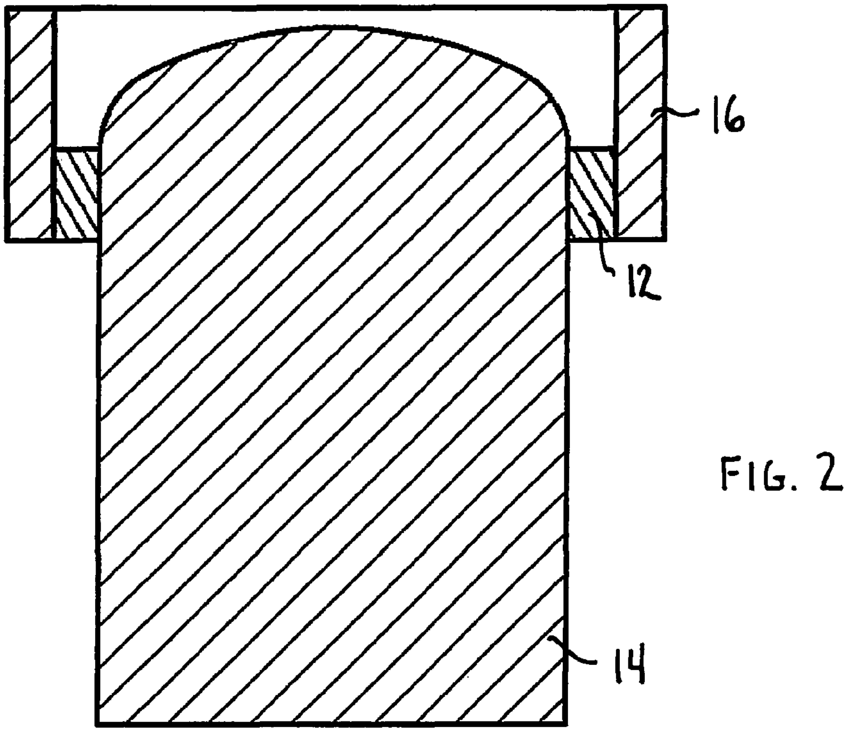
FIG. 2 provides a side view cut-away along Line A-A of the Stirling Engine heater head depicted in FIG. 1.
Figure 3:
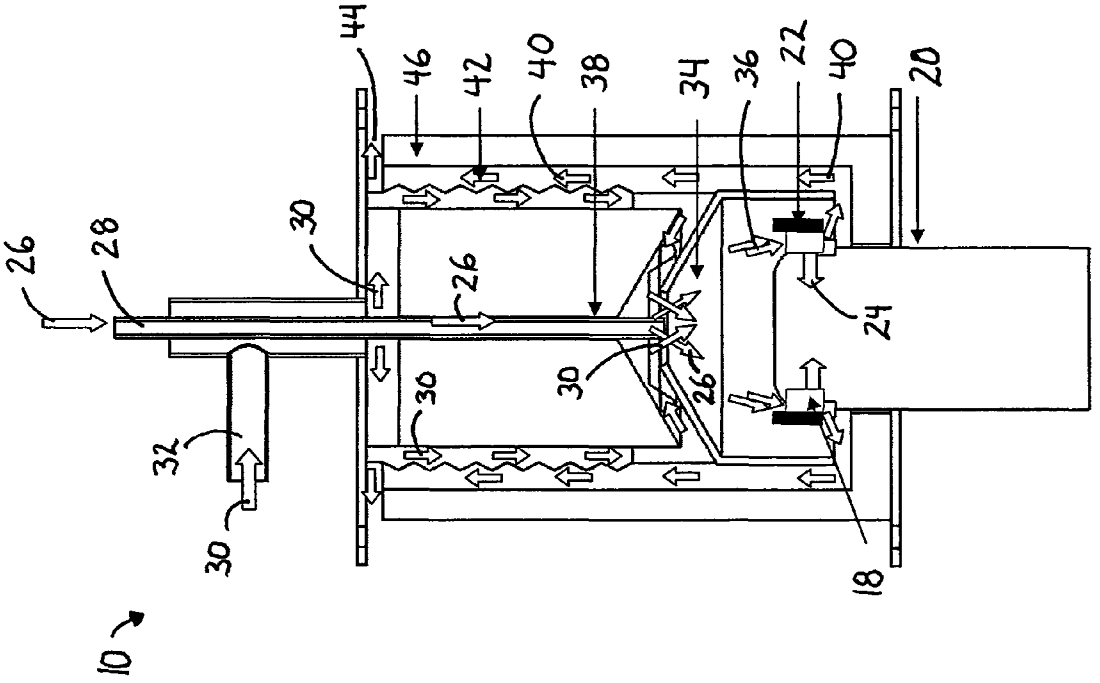
FIG. 3 provides a schematic cut-away of an external combustion engine employing a Stirling Engine heater heat in turn employing a heat source according to the present invention.

As shown in FIGS. 1 and 2 and generally referred to as system 10 in FIG. 3, catalytic reactor 12 is positioned in communication with heater head 14, and rigidly held in place by catalyst holder 16. Catalytic reactor 12 comprises catalyst deposited on Microlith® ultra-short-channel-length metal mesh elements. The reactor provides heat transfer to heater head 14 by thermal conduction. Catalyst holder 16 also serves as a heat exchanger with respect to the heat generated by the catalytic reactor 12 and transferred to the gases passing over and in proximity to catalyst holder 16.

As depicted in FIGS. 2 and 3, system 10 comprises a catalytic reactor 18 positioned in communication with Stirling Engine heater head 20, and held in place by catalyst holder 22. Catalytic reactor 18 provides heat transfer to heater head 20 by thermal conduction 24 through internal heat acceptor 25. In the embodiment of the invention depicted, fuel 26 is introduced via fuel injection path 28 and air 30 is introduced via air injection path 32. Fuel 26 and air 30 are mixed in region 34 providing fuel/air mixture 36. The mixing of fuel 26 and air 30 is advantageously enhanced by incorporating an electrospray nozzle 38 and swirler 39 within fuel injection path 28 such as the method for electrospraying fuels disclosed in U.S. patent application Ser. No. 10/401,226; filed on Mar. 27, 2003, and claiming priority to U.S. Provisional Patent Application No. 60/368,120; which description of such electrospray method is incorporated herein by reference. Catalytic combustion reactants 40 exit catalytic reactor 18 and flow through recuperator 42 until they exit the system at exhaust port 44. Recuperator 42 may be surrounded by insulation layer 46.

The catalytic reactor 18 of the embodiment described above with reference to FIG. 3 comprises the catalytically reactive Microlith® ultra-short-channel-length metal mesh positioned in close proximity to (i.e., not spaced-apart from or in physical connection with) thermally conductive walls. Catalytic reactor 18 further comprises at least one catalyst known in the art for fuel oxidation such as, for example, platinum or palladium on alumina. Fuel 26 comprises conventional JP-8 fuel, and the air/fuel mixing method comprises a method for electrospraying fuels as disclosed in U.S. patent application Ser. No. 10/401,226. Recuperator 42 provides heat transfer from catalytic combustion reactants 40 exiting catalytic reactor 18 and flowing through recuperator 42 to air 30 flowing through air injection path 32.

The liquid fuel is injected, vaporized, mixed with air and ultimately oxidized catalytically. Vaporization, mixing and recuperation are the primary contributors to the overall combustor dimensions. For the burner to be highly efficient, a recuperator was used to extract energy form the exhaust gases and preheat the inlet air. The energy released in the combustor was transferred to the Free Piston Stirling Engine (FPSE) through an optimized heat exchange interface.

To minimize the volume of the mixing chamber preceding catalytic conversion of fuel into combustion products, a whirling flow field by introducing air with a tangential velocity component into the cylindrical chamber. This shows markedly improved temperature uniformity on the catalytic surface, which is crucial for efficient coupling with a Stirling engine. Uniformity of temperature relates directly to the homogeneity of the local equivalence ratio. To this end, a low pressure drop radial swirler was coaxially located with the fuel nozzle a few millimeters downstream of the atomizer. It resulted in uniform mixing of the recuperated inlet air and the fuel droplets. The fuel was fully vaporized and mixed with the oxidizer in the mixing chamber and directed towards the catalyst.

The catalytic reactor discussed has a cylindrical configuration. The use of thin and flexible Microlith™ elements made the conformation to specific geometric requirements relatively easy. In particular, since the hot end of the FPSE is a cylindrical strip, the reactor was cylindrically shaped by placing the Microlith™ catalytic grids around the acceptor zone of the FPSE and flowing the air-fuel mixture through it. The average residence time across the catalytic reactor was estimated at 0.8 ms, which, as expected, is much smaller than the estimated evaporative and mixing time. The prevailing Peclet number, which controls the necessary packing density to achieve complete conversion, was estimated at 30, which required the stacking of several layers to achieve fuel oxidation. Since durability tests showed that the catalyst performance did not deteriorate significantly over a period of 500 hrs, it is anticipated that periodic maintenance of the energy converter will require catalyst replacements at intervals on the order of 1000 hrs.

The exhaust gas was routed through a counterflow heat exchanger consisting of a corrugated metal lamina separating the exhaust from the incoming air, while allowing for heat transfer between the two gases. The recuperator occupied a cylindrical jacket wrapping the burner. This geometric configuration was also chosen to avoid preheating the fuel line because of the fouling risk associated with the use of JP-8. Temperature measurements via K-type thermocouples at the inlet and outlet of the recuperator yielded an estimated heat recovery effectiveness of 85%. In addition to boosting the overall thermal efficiency of the combustor, the recuperator has the important function of reducing the droplet evaporation time by elevating the average temperature in the combustor to 1000 K, thereby increasing the evaporation coefficient several folds. The exhaust gas temperature at 450 K is further decreased by mixing it with engine cooling air at 325 K, to lower the system thermal signature.

The Balance of Plant (BOP) consisted of an air blower, fuel pump, igniter, instrumentation and controls. The challenge was to identify lightweight, compact, low power draw components. In order to minimize the air blower parasitic draw, a low pressure drop recuperator and flow path was designed comprising a controllable, low flow, JP-8 tolerant, inexpensive liquid fuel pump. A resistively heated element, analogous to a glow plug, was used to light off the catalyst, in the presence of fuel and air, at ambient conditions. A very small onboard rechargeable battery was used to energize the igniter, pumps and blowers. The total burner parasitic load consisting of the air blower, fuel pump, ES energizer was <1 We. A control logic for startup, shutdown and load change was identified and implemented via PID controllers.

Under full load conditions, the average catalyst temperature over multiple runs was 1002 K and an average FPSE head temperature of 923 K. With these values, one can estimate the dominant heat transfer between the catalytic reactor and the engine head. To increase the heat transfer between the two system components, a finned cylinder was brazed onto the engine head. The catalyst was placed in conductive contact with the engine head. Thermocouple measurements in the catalyst bed and at the exit of the fins suggested that the convective and radiative heat recovery from the fins was <20%. Conduction was the primary means of thermal input into the engine as confirmed by estimates based on the interface geometry and an average thermal conductivity for Nickel 201 over the temperature range under consideration. The balance of the 200 Wt input as chemical energy was split into 30 Wt associated with the exhaust gases at 450 K after recuperation, and 38 Wt of various other losses associated with imperfect insulation of the structure, as depicted in FIG. 10. Note that the heat transfer efficiency from the fuel to the head was compromised due to heat losses, e.g. flanges and thick walled chambers acting as heat sinks in the test setup, radiative and convective losses to the exhaust, limited insulation, etc. Once optimized, it is likely to improve the overall fuel to electric efficiency. Remarkably, even though JP-8 is notoriously problematic, with attendant coking and sooting tendencies, the burner operated cleanly with no noticeable traces of deposits. The burner design was also scaled up for a 160 We propane fueled battery charger unit and its performance demonstrated.

From the efficiency of the individual components, burner efficiency can be defined as the ratio of the thermal power input to engine over the chemical power associate with the mass flow rate of a fuel of a prescribed heating values. An efficiency flow chart representing the burner, recuperator and FPSE acceptor along with the losses observed due to leaks and poor insulation are represented in FIG. 10. The overall conversion efficiency of fuel (chemical energy) to electrical energy was 22% (gross). Net of parasitics it was approximately 20%.

The present invention demonstrates the development of a compact, lightweight, efficient recuperated JP-8 burner to provide the heat source for Stirling engines. Optimal catalyst, swirler, electrospray, igniter and recuperator designs were implemented. The burner was integrated with a FPSE and problems due to soot or coke deposit were avoided. A small pump and blower was identified and implemented with net parasitic loads <1 We. A simple burner control logic was identified and implemented for operational flexibility. Results with a brassboard unit showed high gross fuel-electric efficiency of 22% (20% net of parasitics) at extremely low acoustic and thermal signatures. This indicates an energy density on the order of 1,000 W-hr/kg (3.6 MJ/kg). These figures are significantly better than larger commercially available generator sets, which range between 5-12% fuel to electric efficiency. Burner scalability and multi-fuel operation (with H2, Propane, Propylene, etc.) was demonstrated in a parallel 160 We battery charger unit.

Figure 4:
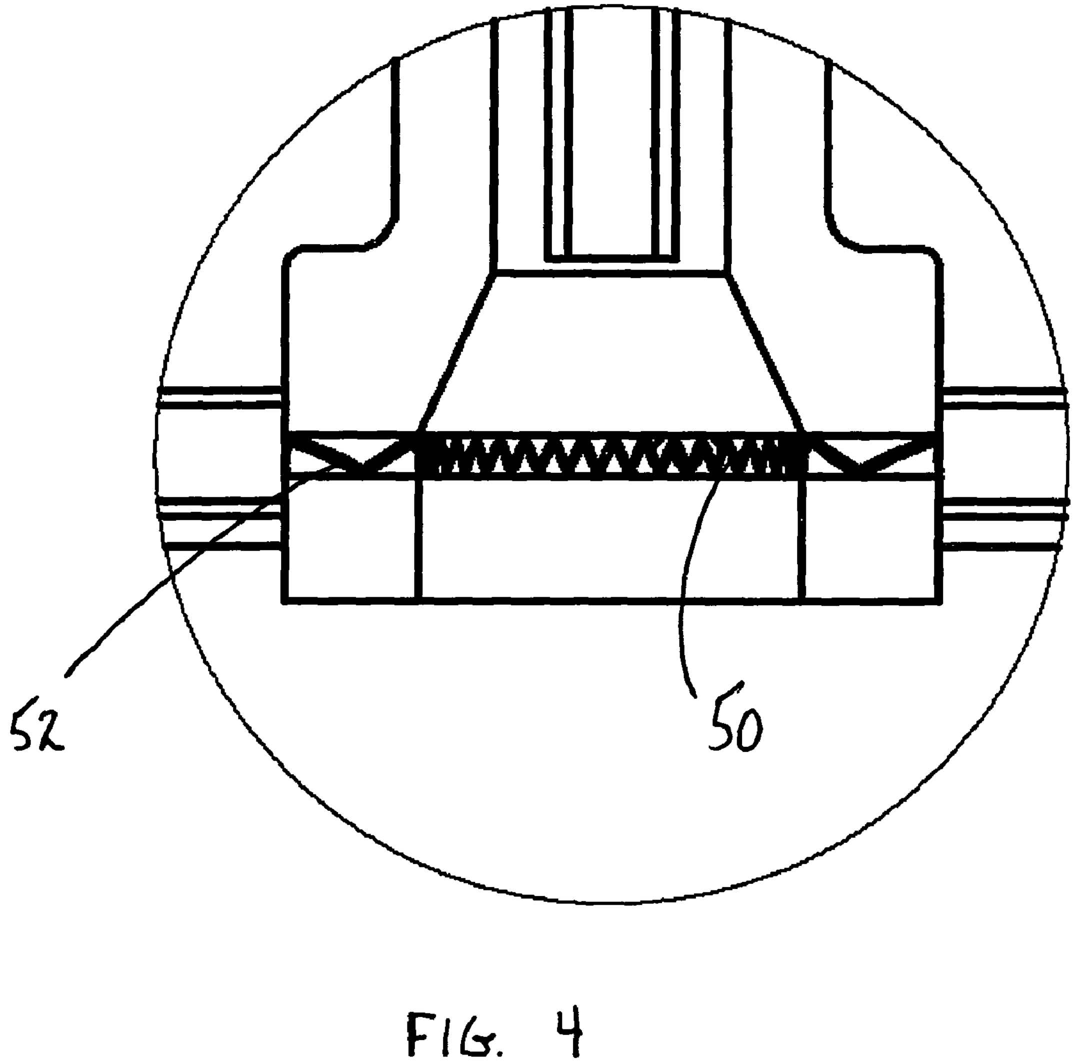
FIG. 4 provides an isometric view of a grounded swirler in accordance with the present invention.
Figure 5:
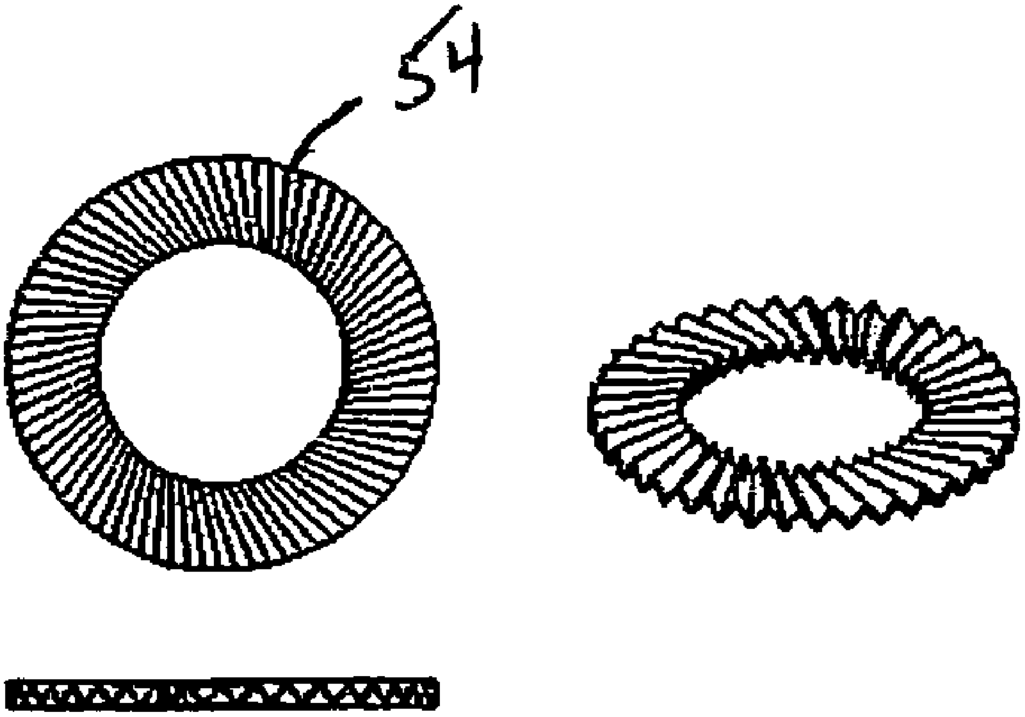
FIG. 5 provides a top, side and isometric view of a swirler in accordance with the present invention.

In the embodiment of the present invention described hereinabove, the electrospray approach provided electrical isolation and a ground terminal. As shown in FIG. 4, the swirler 50 was used as the grounding source 52. The electrical isolation can thus be readily implemented. A novel swirler 54 as shown in FIG. 5 was used for low pressure drop and good mixing. The swirler is made of a Nickel-Chrome strip corrugated at a 30 degree angle and formed into a circular part inducing a 30 degree swirl to the incoming air.

Figure 6:
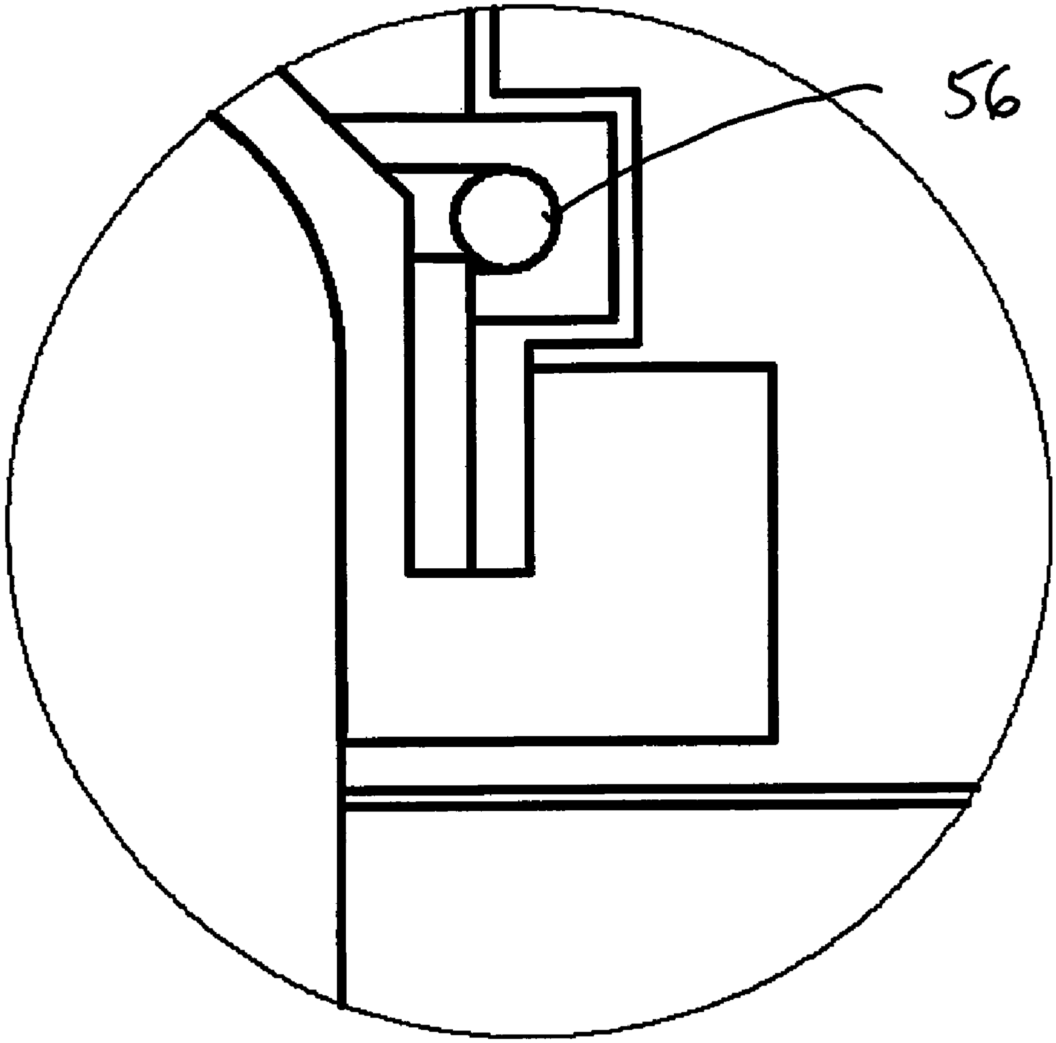
FIG. 6 provides a schematic cut-away of an external combustion engine employing a Stirling Engine heater heat in turn employing a ignition source according to the present invention.

Ignition of the fuel on the catalyst was implemented by a cable heater 56 wrapped in a circle concentric to the catalyst and adjacent to the outer corner of the catalyst substrate as shown in FIG. 6. The power provided to the 5.4" long 0.0625"D heater was 19V at 3 Amps. The radiation and conduction of this 57 Watts of heat permitted lighting off the catalyst with low electrical power while minimizing contact of the heater with the catalyst for maximum life and minimized power.

Figure 7:
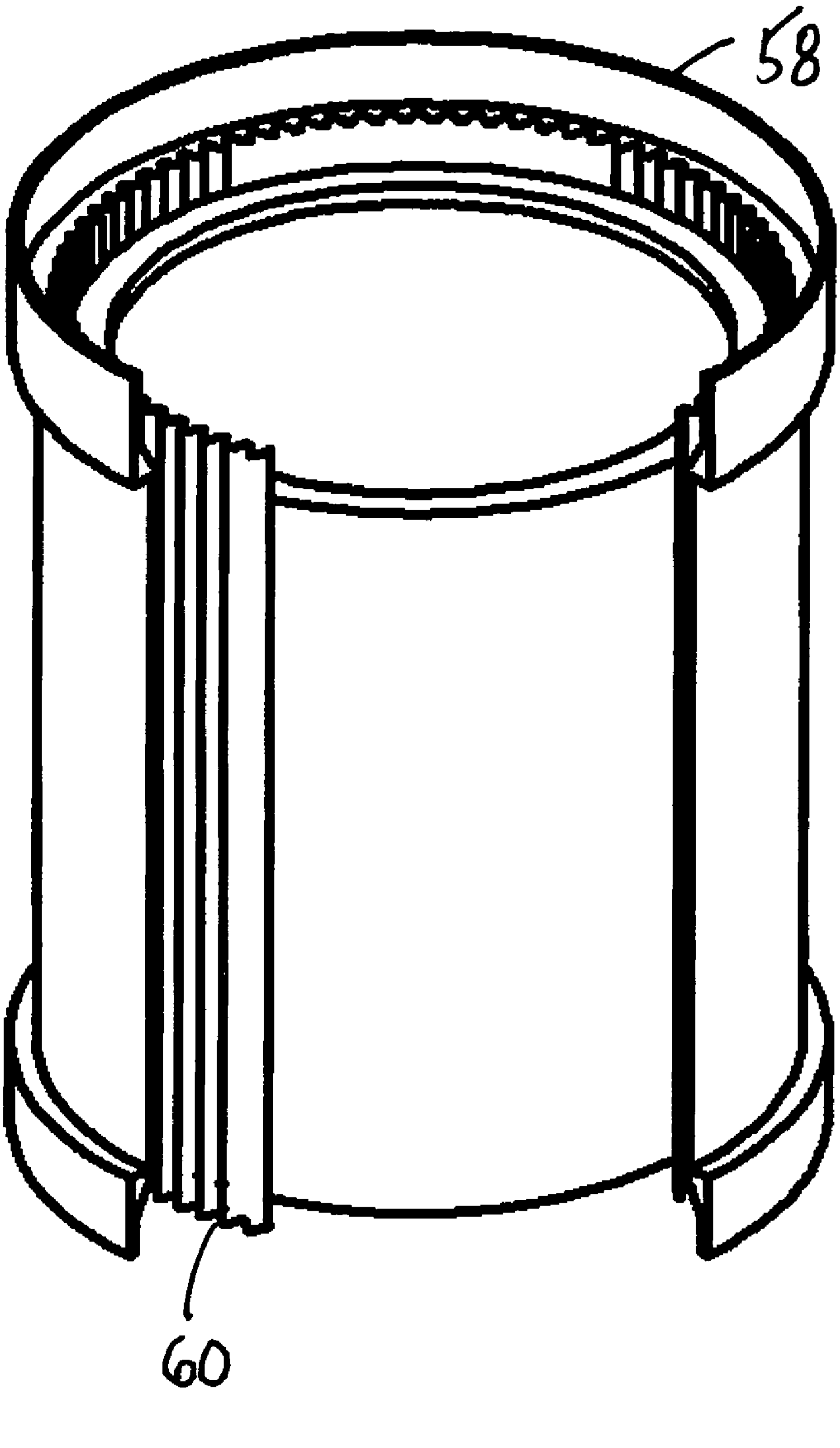
FIG. 7 provides an isometric view of a recuperator in accordance with the present invention.

As shown in FIG. 7, recuperator 58 is integrated with the burner such as to shield the hot zone (via an extension of the recuperator) and to also provide the external burner housing. Insulation is applied to this housing. The recuperator is constructed of corrugated stainless steel 60. This design provides the necessary heat transfer from catalyst to inlet air that would otherwise be lost while also maintaining a low enough pressure drop to work with the system.

Figure 8:
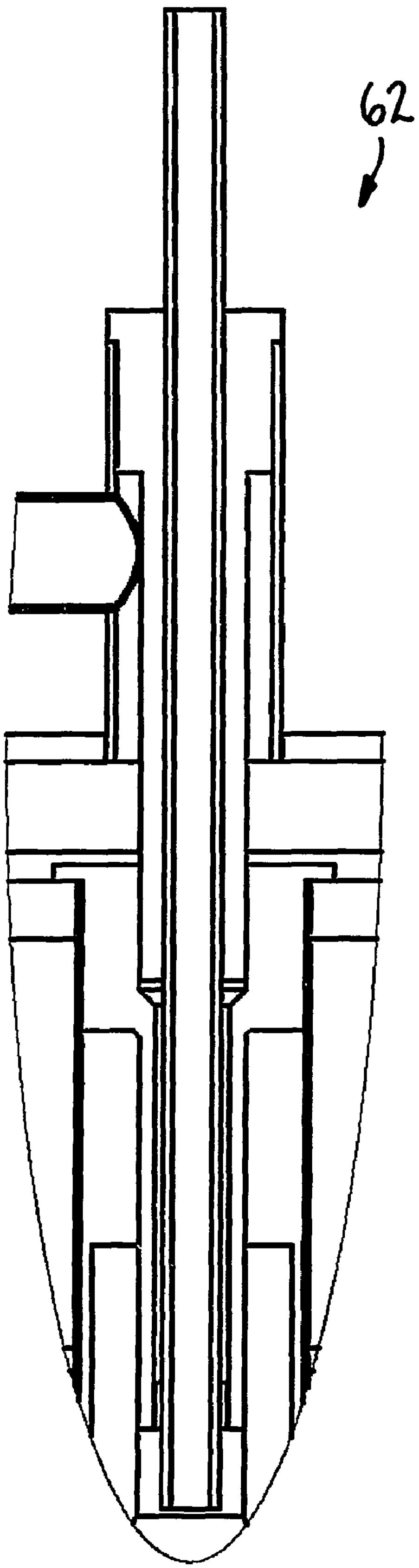
FIG. 8 provides an isometric view of a fuel nozzle in accordance with the present invention.

Fuel nozzle 62 depicted in FIG. 8 is located such as to use bypassed inlet combustion air for nozzle cooling (a critical requirement to prevent deposits within the nozzle and fuel boiling). Approximately five percent of the air into the burner is routed straight to the combustion area along the fuel nozzle, bypassing the recuperator to keep the temperature low. This prevents the fuel from heating to the point of creating coke/fuel deposits and spontaneous boiling away from the tip, causing erratic operation. The fuel delivery system also permits inorganic contaminants to deposit on a collection plate as opposed to fouling up the catalyst. Inorganic components in the fuel do not vaporize and due to the non collinear orientation of the nozzle to the catalyst, the inorganics drop straight down while the vaporized fuel/air carries on to the catalyst.

Figure 9:
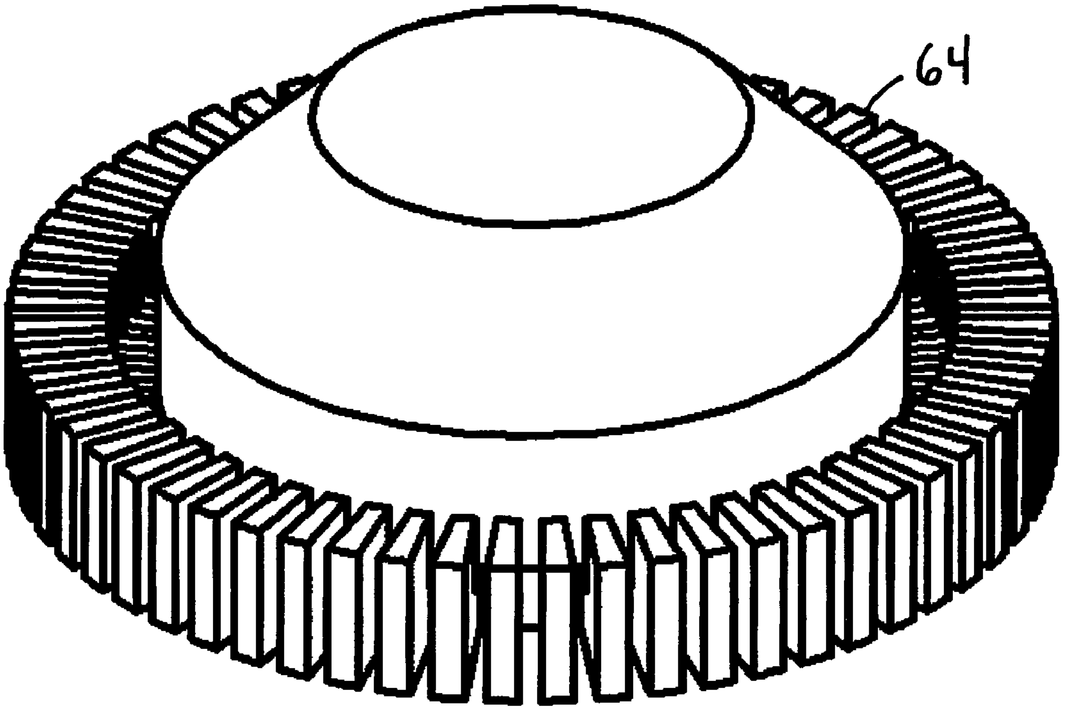
FIG. 9 provides an isometric view of a heat exchanger configuration in accordance with the present invention.
Figure 1D:
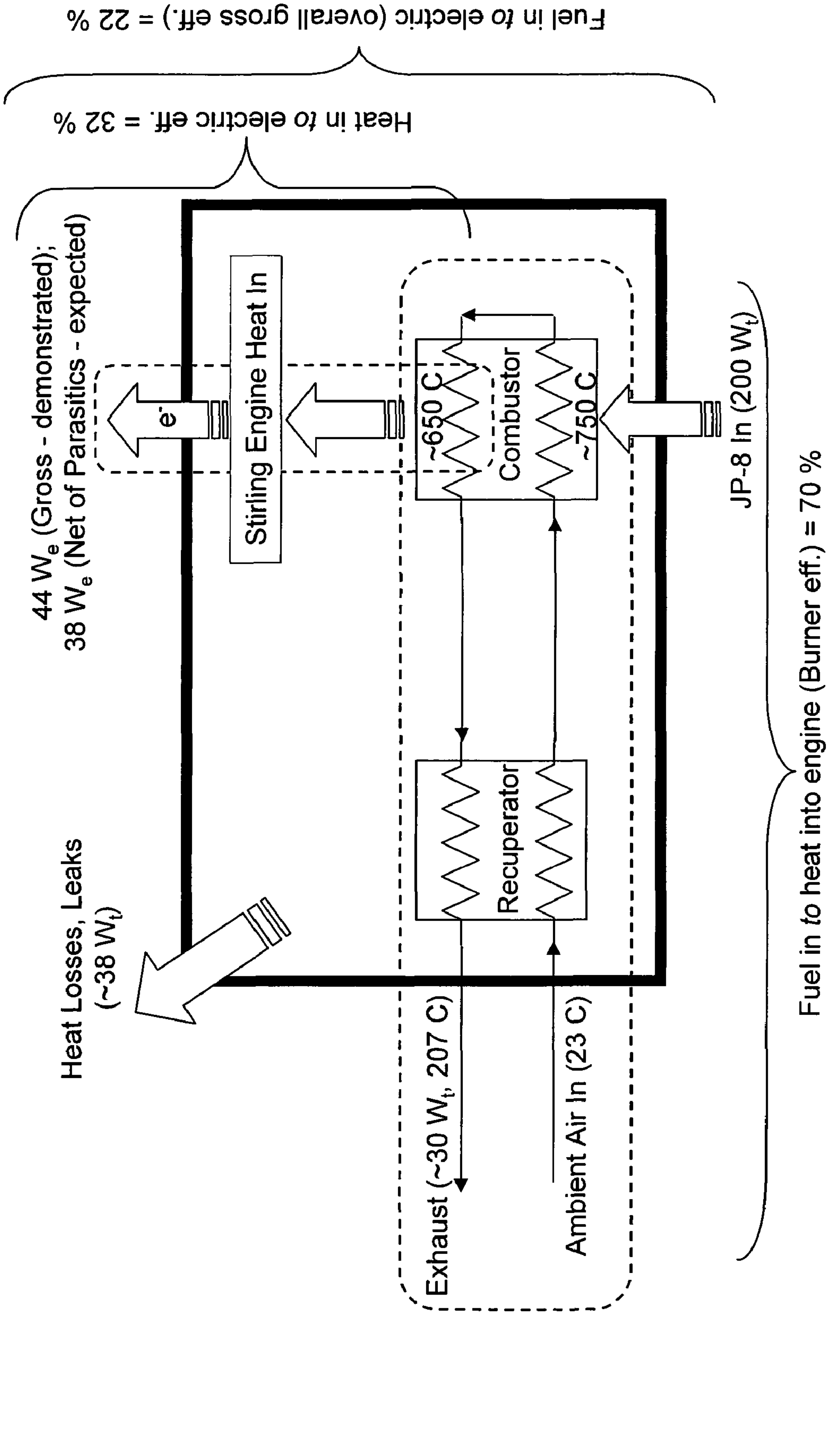

As shown in FIG. 9, heat exchange fins 64 are designed such as to hold the catalyst, maximize the heat transfer from the catalyst to the fins and appropriately overlap the acceptor fins, internal to the engine, such as to maximize the heat transfer efficiency to the engine. Nickel fins are used for the maximum heat transfer coefficient at high temperature while maintaining corrosion resistance at 650 C. The geometry and location of the heat exchanger and catalyst pack are chosen to optimize conduction, convection and radiation of heat from the catalyst reaction into the engine head.

A mounting design whereby the burner is made easily removable/attachable from/to the engine for service purposes and for ease of manufacture. This design is based on two closely mated surfaces, forced together to optimize heat transfer between them, while also being removable with a minimum of time and tooling. The surface on the heat generation side fits down over the receiver side. The main housing of the burner snaps to the acceptor head by means of a snap ring with a ceramic paper seal. The engagement occurs at the outer-most edge of a thin plate welded to the acceptor head and the plate is insulated from the combustion exhaust to avoid excessive heat loss. The thin plate is crimped on the edge to provide rigidity for the sealing surface and a more obstructive leak path. Appropriate heat shielding to prevent overheating of the engine dome was incorporated as well as burner assembly/clamping means to permit ease of assembly while preventing leaks. Contact of the heater with the outer shell must be limited in order to minimize heat transfer away from catalyst by conduction, and maximize heater temp to maximize radiation.

While the present invention has been described in considerable detail, other configurations exhibiting the characteristics taught herein for improved heat generation and transfer to the heater head of a Stirling Engine by thermal conduction employing flameless combustion are contemplated. Therefore, the spirit and scope of the invention should not be limited to the description of the preferred embodiments described herein.

What is claimed is:

1. An apparatus for generating and transferring heat via conduction to a heater head of an external combustion engine comprising:

a. a combustor into which is secured a heater head of an external combustion engine, the combustor comprising a chamber for mixing a fuel and air;

b. a fuel injection path for feeding a liquid fuel into the chamber;

c. an air injection path for feeding air into the chamber;

d. a catalytic reactor in non-spaced apart contact with the heater head, the catalytic reactor comprising a catalyst deposited on ultra-short-channel-length metal mesh elements;

e. an igniter for lighting off the catalyst for flameless combustion of the fuel with air; and f. an outlet port for exhausting combustion gases.

2. The apparatus of claim 1 wherein the combustion catalyst comprises platinum or palladium on alumina deposited on the ultra-short-channel-length metal mesh elements.

3. The apparatus of claim 1 further comprising an electrosprayer for dispersing the liquid fuel into the chamber.

4. The apparatus of claim 1 further comprising a swirler for mixing the fuel and air fed to the chamber.

5. The apparatus of claim 1 further comprising a recuperator for recovering heat from the combustion gases being exhausted and transferring heat to inlet air.

6. The apparatus of claim 5 wherein the recuperator comprises a corrugated metal lamina heat exchanger.

* * * * *